(12) United States Patent
Turner et al.

(10) Patent No.: US 6,480,182 B2
(45) Date of Patent: Nov. 12, 2002

(54) PRINTABLE ELECTRONIC DISPLAY

(75) Inventors: Christopher Turner, Somerville; Joseph M. Jacobson; Barrett Comiskey, both of Cambridge, all of MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/910,577

(22) Filed: Jul. 20, 2001

(65) Prior Publication Data

US 2001/0045934 A1 Nov. 29, 2001

Related U.S. Application Data

(62) Division of application No. 08/820,057, filed on Mar. 18, 1997.

(51) Int. Cl.$^7$ .................................................. G09G 3/34
(52) U.S. Cl. .......................... 345/107; 345/205; 345/87; 349/41; 349/86; 349/89
(58) Field of Search .......................... 345/107, 84, 96, 345/205; 359/43, 60, 296; 349/86, 89, 90, 41

(56) References Cited

U.S. PATENT DOCUMENTS

| | | |
|---|---|---|
| 2,800,457 A | 7/1957 | Green et al. |
| 3,036,388 A | 5/1962 | Tate |
| 3,406,363 A | 10/1968 | Tate |
| 3,460,248 A | 8/1969 | Tate |
| 3,585,381 A | 6/1971 | Hodson et al. |
| 3,668,106 A | 6/1972 | Ota |
| 3,792,308 A | 2/1974 | Ota |
| 4,001,140 A | 1/1977 | Foris et al. |
| 4,088,395 A | 5/1978 | Giglia |
| 4,093,534 A | 6/1978 | Carter et al. |
| 4,126,854 A * | 11/1978 | Sheridon .................... 345/107 |
| 4,143,103 A | 3/1979 | Sheridon |

(List continued on next page.)

FOREIGN PATENT DOCUMENTS

| | | |
|---|---|---|
| EP | 0 186 710 | 7/1986 |
| EP | 0 268 877 | 6/1988 |
| EP | 0 281 204 | 9/1988 |

(List continued on next page.)

OTHER PUBLICATIONS

English language abstract of German reference DE 4431441C (1 sheet).

English language abstract of German reference DE 19500694 A (1 sheet).

Vaz, N.A. and Montgomery, G.P., Jr., "Dual Frequency Addressing of Polymer–Dispersed Liquid–Crystal Films," Journal of Applied Physics, vol. 65, No. 12, pp. 5043–5050 (Jun. 15, 1989).

(List continued on next page.)

*Primary Examiner*—Bipin Shalwala
*Assistant Examiner*—David L. Lewis
(74) *Attorney, Agent, or Firm*—Testa, Hurwitz & Thibeault, LLP

(57) ABSTRACT

A display system includes a substrate upon which the display system is fabricated; a printable electrooptic display material, such as a microencapsulated electrophoretic suspension; electrodes (typically based on a transparent, conductive ink) arranged in an intersecting pattern to allow specific elements or regions of the display material to be addressed; insulating layers, as necessary, deposited by printing; and an array of nonlinear elements that facilitate matrix addressing. The nonlinear devices may include printed, particulate Schottky diodes, particulate PN diodes, particulate varistor material, silicon films formed by chemical reduction, or polymer semiconductor films. All elements of the display system may be deposited using a printing process.

5 Claims, 14 Drawing Sheets

U.S. PATENT DOCUMENTS

| | | | |
|---|---|---|---|
| 4,149,149 A | 4/1979 | Miki et al. | |
| 4,211,668 A | 7/1980 | Tate | |
| 4,231,641 A | 11/1980 | Randin | |
| 4,261,653 A | 4/1981 | Goodrich | |
| 4,273,672 A | 6/1981 | Vassiliades | |
| 4,298,448 A | 11/1981 | Muller et al. | |
| 4,301,407 A | 11/1981 | Koslar | |
| 4,305,807 A | 12/1981 | Somlyody | |
| 4,368,952 A | 1/1983 | Murata et al. | |
| 4,418,346 A | 11/1983 | Batchelder | |
| 4,419,383 A | 12/1983 | Lee | |
| 4,430,648 A | 2/1984 | Togashi et al. | |
| 4,438,160 A | 3/1984 | Ishikawa et al. | |
| 4,450,440 A | 5/1984 | White | |
| 4,643,528 A | 2/1987 | Bell, Jr. | |
| 4,741,601 A | 5/1988 | Saito | |
| 4,919,521 A | 4/1990 | Tada et al. | |
| 4,947,219 A | 8/1990 | Boehm | |
| 5,042,917 A * | 8/1991 | Fujita et al. | 359/60 |
| 5,057,363 A | 10/1991 | Nakanishi | |
| 5,066,105 A | 11/1991 | Yoshimoto et al. | |
| 5,066,559 A | 11/1991 | Elmasry et al. | |
| 5,070,326 A | 12/1991 | Yashimoto et al. | |
| 5,082,351 A | 1/1992 | Fergason | |
| 5,105,185 A | 4/1992 | Nakanowatari et al. | |
| 5,128,785 A | 7/1992 | Yashimoto et al. | |
| 5,216,530 A * | 6/1993 | Pearlman et al. | 359/43 |
| 5,220,316 A * | 6/1993 | Kazan | 340/784 |
| 5,250,932 A | 10/1993 | Yoshimoto et al. | |
| 5,270,843 A | 12/1993 | Wang | |
| 5,380,362 A | 1/1995 | Schubert | |
| 5,389,945 A | 2/1995 | Sheridon | |
| 5,398,131 A | 3/1995 | Hall et al. | |
| 5,421,926 A | 6/1995 | Yukinobu et al. | |
| 5,484,522 A | 1/1996 | Entrekin | |
| 5,508,068 A | 4/1996 | Nakano | |
| 5,543,177 A | 8/1996 | Morrison et al. | |
| 5,548,282 A | 8/1996 | Escritt et al. | |
| 5,565,885 A | 10/1996 | Tamanoi | |
| 5,582,700 A | 12/1996 | Bryning et al. | |
| 5,604,027 A | 2/1997 | Sheridon | |
| 5,708,525 A * | 1/1998 | Sheridon | 359/296 |
| 5,982,346 A | 11/1999 | Sheridon et al. | |
| 5,986,629 A * | 11/1999 | Smith et al. | 345/84 |

FOREIGN PATENT DOCUMENTS

| | | | |
|---|---|---|---|
| EP | 0 361 420 | 4/1990 | |
| EP | 0 404 545 | 12/1990 | |
| EP | 0 443 571 | 8/1991 | |
| EP | 0 540 281 | 5/1993 | |
| EP | 0 622 721 | 11/1994 | |
| EP | 0 684 579 A2 | 11/1995 | |
| EP | 0 721 176 | 7/1996 | |
| GB | 2149548 A | 6/1985 | |
| JP | 62058222 | 3/1987 | |
| JP | 62231930 | 10/1987 | |
| JP | 64-86116 * | 3/1989 | G02F/1/19 |
| JP | 01177517 | 7/1989 | |
| JP | 1314906 | 12/1989 | |
| JP | 6089081 | 3/1994 | |
| WO | US96/13469 | 5/1996 | |
| WO | 97/04398 | 2/1997 | |

OTHER PUBLICATIONS

Lee, L.L., "Fabrication of Magnetic Particles Displays," Proceeding of the S.I.D., vol. 18/3 & 4, pp. 283–288 (1977).

Sheridon, N.K., et al., "The Gyricon—A Twisting Ball Display," Proceeding of the S.I.D., vol. 18/3 & 4, pp. 289–293 (1977).

Saitoh, M., et al., "A Newly Developed Electrical Twisting Ball Display," Proceedings of the S.I.D., vol. 23/4, pp. 249–253 (1982).

Egashira, N., et al., "A Solid Electrochromic Cell consisting of Lu–Diphthalocyanine and Lead Fluoride," Proceedings of the S.I.D., vol. 28/3, pp. 227–232 (1987).

Bohnke, O., et al., "Polymer–Based solid Elecrochromic Cell for Matrix–Addressable Display Devices," J. Electrochem. Soc., 138(12):3612–3617 (Dec. 1991).

Hosaka, H., et al., "Electromagnetic Microrelays: Concepts and Fundamental characteristics," Sensors and Actuators A, pp. 41–47 (1994).

Clarisse, C., et al., "Field–Effect Transistor with Diphthalocyanine Thin Film," Electronics Letters, 24(11):674–675 (May 1988).

Yang, Y., et al., "A New Architecture for Polymer Transistors," Nature, vol. 373 (Nov. 1994).

Jin, S., et al., "Optically Transparent, Electrically Conductive Composite Medium," Science, pp. 446–448 (Jan. 1992).

Bryce, M.R., "Seeing Through Synthetic Metals," Nature, vol. 335 (Sep. 1988).

Sankus, Joseph, "Electrophoretic Display Cell," Xerox Disclosure Journal, vol. 4, No. 3, May/Jun. 1979, p. 309.

* cited by examiner

PRINTABLE ELECTRONIC DISPLAY

This is a division of U.S. Ser. No. 08/820,057, filed Mar. 18, 1997, the disclosure of which is incorporated by reference herein.

FIELD OF THE INVENTION

The present invention relates to electronic displays, and in particular to non-emissive, flat-panel displays.

BACKGROUND OF THE INVENTION

Electrooptic display systems typically include an electrooptic element (e.g., the display material itself) and electrodes (either opaque or transparent) for applying control voltages to the electrooptic element. Such a system may also include a nonlinear element to allow for multiplexing of the address lines to the electrodes, and an insulating material between various layers of the display system. These components have been fabricated by a multitude of conventional processes. For versatility and convenience of manufacture, many recent efforts have focused on producing all components of such displays by deposition printing using, for example, screen or ink-jet printing apparatus. The use of printing techniques allows displays to be fabricated on a variety of substrates at low cost.

The conducting materials used for electrodes in display devices have traditionally been manufactured by commercial deposition processes such as etching, evaporation, and sputtering onto a substrate. In electronic displays it is often necessary to utilize a transparent electrode to ensure that the display material can be viewed. Indium tin oxide (ITO), deposited by means of a vacuum-deposition or sputtering process, has found-widespread acceptance for this purpose. More recently, ITO inks have been deposited using a printing process (see, e.g., U.S. Pat. No. 5,421,926).

For rear electrodes (i.e., the electrodes other than those through which the display is viewed) it is often not necessary to utilize transparent conductors. Such electrodes can therefore be formed from a material such as a silver ink. Again, these materials have traditionally been applied using costly sputtering or vacuum deposition methods.

Nonlinear elements, which facilitate matrix addressing, are an essential part of many display systems. For a display of M×N pixels, it is desirable to use a multiplexed addressing scheme whereby M column electrodes and N row electrodes are patterned orthogonally with respect to each other. Such a scheme requires only M+N address lines (as opposed to M×N lines for a direct-address system requiring a separate address line for each pixel). The use of matrix addressing results in significant savings in terms of power consumption and cost of manufacture. As a practical matter, its feasibility usually hinges upon the presence of a nonlinearity in an associated device. The nonlinearity eliminates crosstalk between electrodes and provides a thresholding function. A traditional way of introducing nonlinearity into displays has been to use a backplane having components that exhibit a nonlinear current/voltage relationship. Examples of such devices used in displays include thin-film transistors (TFT) and metal-insulator-metal (MIM) diodes. While these types of devices achieve the desired result, both involve thin-film processes. Thus they suffer from high production cost as well as relatively poor manufacturing yields.

Another nonlinear system, which has been used in conjunction with liquid crystal displays, a printed varistor backplane (see, e.g., U.S. Pat. Nos. 5,070,326; 5,066,105; 5,250,932; and 5,128,785, hereafter the "Yoshimoto patents," the entire disclosures of which are hereby incorporated by reference). A varistor is a device having a nonlinear current/voltage relationship. Ordinarily, varistors are produced by pressing various metal-oxide powders followed by sintering. The resulting material can be pulverized into particulate matter, which can then be dispersed in a binder.

Additionally, the prior art mentions the use of a varistor backplane to provide thresholding for a non-emissive electrophoretic display device; see Chiang, "A High Speed Electrophoretic Matrix Display," *SID* 1980 *Technical Digest*. The disclosed approach requires the deposition of the display material into an evacuated cavity on a substrate-borne, nonprinted varistor wafer. Thus, fabrication is relatively complex and costly.

Some success has been achieved in fabricating electronic displays using printing processes exclusively. These displays, however, have for the most part been emissive in nature (such as electroluminescent displays). As is well known, emissive displays exhibit high power-consumption levels. Efforts devoted to nonemissive displays generally have not provided for thresholding to facilitate matrix addressing.

DESCRIPTION OF THE INVENTION

Brief Summary of the Invention

The present invention facilitates fabrication of an entire nonemissive (reflective), electronically addressable display using printing techniques. In particular, printing processes can be used to deposit the electrodes, insulating material, the display itself, and an array of nonlinear devices to facilitate addressing. Accordingly, fabrication of the displays of the present invention may be accomplished at significantly lower cost and with far less complexity than would obtain using coventional fabrication technologies. Furthermore, the approach of the present invention affords greater versatility in fabrication, allowing the displays to be applied to substrates of arbitrary flexibility and thickness (ranging, for example, from polymeric materials to paper). For example, static screen-printed displays may be used in signs or lettering on consumer products; the invention can also be used to form dynamic, electronically alterable displays. Moreover, the invention can be employed to produce flat-panel displays at manufacturing costs well below those associated with traditional devices (e.g., liquid crystal displays).

As used herein, the term "printing" connotes a non-vacuum deposition process capable of creating a pattern. Examples include screen printing, ink-jet printing, and contact processes such as lithographic and gravure printing.

For the display element, the present invention utilizes certain particle-based nonemissive systems such as encapsulated electrophoretic displays (in which particles migrate within a dielectric fluid under the influence of an electric field), electrically or magnetically driven rotating-ball displays (see, e.g., U.S. Pat. Nos. 5,604,027 and 4,419,383), and encapsulated displays based on micromagnetic or electrostatic particles (see, e.g., U.S. Pat. Nos. 4,211,668; 5,057,363 and 3,683,382). A preferred approach is based on discrete, microencapsulated electrophoretic elements, suitable examples of which are disclosed in U.S. application Ser. No. 08/738,260 and PCT application Ser. No. US 96/13469. The entire disclosures of the '027, '383, '668, '363, and '382 patents, as well as the '260 and '469 applications, are hereby incorporated by reference.

Electrophoretic displays in accordance with the '260 application are based on microcapsules each having therein an electrophoretic composition of a dielectric fluid and a suspension of particles that visually contrast with the dielectric liquid and also exhibit surface charges. A pair of electrodes, at least one of which is visually transparent, covers opposite sides of a two-dimensional arrangement of such microcapsules. A potential difference between the two electrodes causes the particles to migrate toward one of the electrodes, thereby altering what is seen through the transparent electrode. When attracted to this electrode, the particles are visible and their color predominates; when they are attracted to the opposite electrode, however, the particles are obscured by the dielectric liquid.

In accordance with the present invention, the electrophoretic microcapsules are suspended in a carrier material that may be deposited using a printing process. The suspension thereby functions as a printable electrophoretic ink. Preferably, the electrodes are also applied using a printing process. For example, the transparent electrode(s) may be a print-deposited ITO composition, as described in the above-mentioned '926 patent, and the rear electrodes may also be an ITO composition or, alternatively, a silver ink. The electrophoretic ink is deposited between the electrode arrays, forming a sandwich structure.

Preferably, the invention also includes a series of nonlinear devices that facilitate matrix addressing, whereby M×N pixels are address with M+N electrodes; again, these devices (which may include diodes, transistors, varistors or some combination) are desirably applied by printing. In one approach, a varistor backplane is deposited in accordance with, for example, the Yoshimoto patents described above. Alternatively, a backplane of nonlinear devices may utilize printed particulate silicon diodes as taught, for example, in U.S. Pat. No. 4,947,219 (the entire disclosure of which is hereby incorporated by reference). With this approach, a particulate doped silicon is dispersed in a binder and applied in layers to produce diode structures.

Thus, a display system in-accordance with the invention may include a substrate upon which the display system is fabricated; a printable electrooptic display material, such as a microencapsulated electrophoretic suspension; printable electrodes (typically based on a transparent, conductive ink) arranged in an intersecting pattern to allow specific elements or regions of the display material to be addressed; insulating layers, as necessary, deposited by printing; and an array of nonlinear elements that facilitate matrix addressing. The nonlinear devices may include printed, particulate Schottky diodes, particulate PN diodes, particulate varistor material, silicon films formed by chemical reduction, or polymer semiconductor films.

The displays of the present invention exhibit low power consumption, and are economically fabricated. If a bistable display material is used, refreshing of the display is not required and further power consumption is achieved. Because all of the components of the display are printed, it is possible to create flat-panel displays on very thin and flexible substrates.

In another aspect, the invention comprises means for remotely powering a nonemissive display, and in still another aspect, the invention comprises a graduated scale comprising a series of nonemissive displays each associated with a nonlinear element having a different breakdown voltage.

BRIEF DESCRIPTION OF THE DRAWINGS.

The foregoing discussion will be understood more readily from the following detailed description of the invention, when taken in conjunction with the accompanying drawings, in which.

DETAILED DESCRIPTION OF THE PREFERRED EMBODIMENTS

Figure 1:
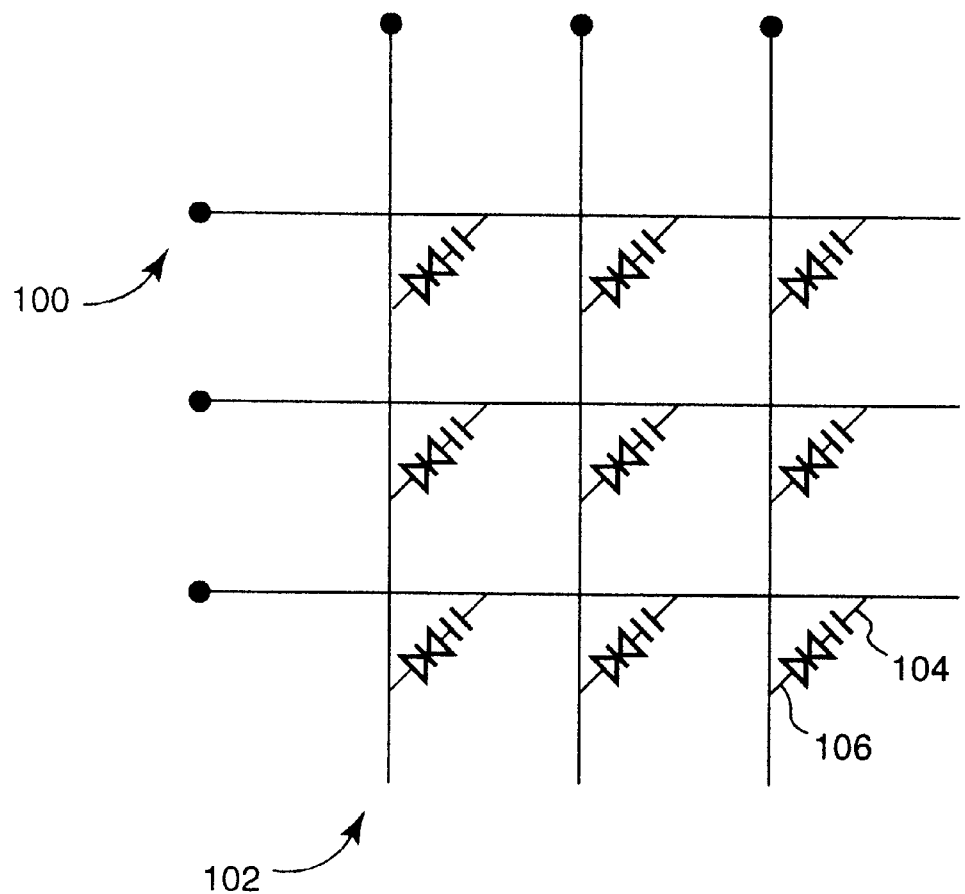
FIG. 1 schematically represents a display in accordance with the present invention, including row and column electrodes, an electrooptic display material, and an array of nonlinear elements.

Refer first to FIG. 1, which schematically illustrates a display system in accordance with the invention. The depicted system includes an electrophoretic display, and the various components are deposited by a printing process as permitted by the present invention. It should be understood, however, that the invention may be practiced using other particle-based displays, and with components deposited by conventional (e.g., vacuum-type) processes.

The illustrated embodiment includes a series of row and column electrodes indicated generally at 100 and 102, respectively, and preferably formed using a printed conductive ink. Assuming the column electrodes 100 are the ones through which the display is viewed, these are transparent. The row electrodes 102, which serve as the rear electrodes, may or may not be transparent, depending upon the application. The electrophoretic display material 104 and the nonlinear elements 106 are sandwiched between column electrodes 100 and row electrodes 102, forming a series circuit at each topological point of overlap (intersection) between the two electrode arrays. The display element 104 is shown as a capacitor because, for most display applications, the display material acts as a dielectric between two conductive plates (the electrodes), essentially forming a capacitor. The nonlinear element 106 is depicted as two back-to-back diodes because the I-V characteristic of element 106 is preferably similar thereto.

The display shown in FIG. 1 may be addressed by any of a variety of schemes. Assume, for purposes of discussion, that the voltage across a display pixel 104 and the associated nonlinear element 106 is defined as the row voltage ($V_r$) minus the column voltage ($V_c$). Assume further that the display material is configured to "switch" or change state if a certain voltage $V_{on}$ or greater is applied to it, and to reassume the original state when a voltage of $-V_{on}$ is applied across it. The voltage $V_{on}$ is a function of the display material and the desired switching speed.

In a matrix addressing scheme it possible to selectively apply voltage of $V_{on}$ or $-V_{on}$ to certain pixels using row-at-a-time addressing, but unselected pixels may experience a voltage of up to $V_{on}/2$ in magnitude. This half-select voltage $V_h$ is the reason that a threshold is required. By placing a nonlinear element 106 in series with the display material, interference (e.g., slow but nonetheless perceptible switching) due to $V_h$ is eliminated. The nonlinear element 106 is chosen such that for voltages of less than $V_h$ across it, very little current flows. When the voltage across nonlinear element 106 rises to $V_{on}$, however, the device effectively acts as a smaller resistance, allowing more current to flow. This prevents "half-selected" pixels from switching while ensuring that fully selected ones do switch. It is thus necessary to have a nonlinear device with symmetrical characteristics such that $V_b$, the breakdown voltage of the device, is greater than $V_h$, but less than $V_{on}$. The amount of current that the device passes at $V_{on}$ determines the switching speed of the display; that is, the amount of current passed at $V_h$ determines how long it will take an unselected pixel to switch, and thus in non-bistable systems effectively determines how many pixels can be multiplexed (by dictating how often the display must be refreshed for a given switching speed).

Figure 2:
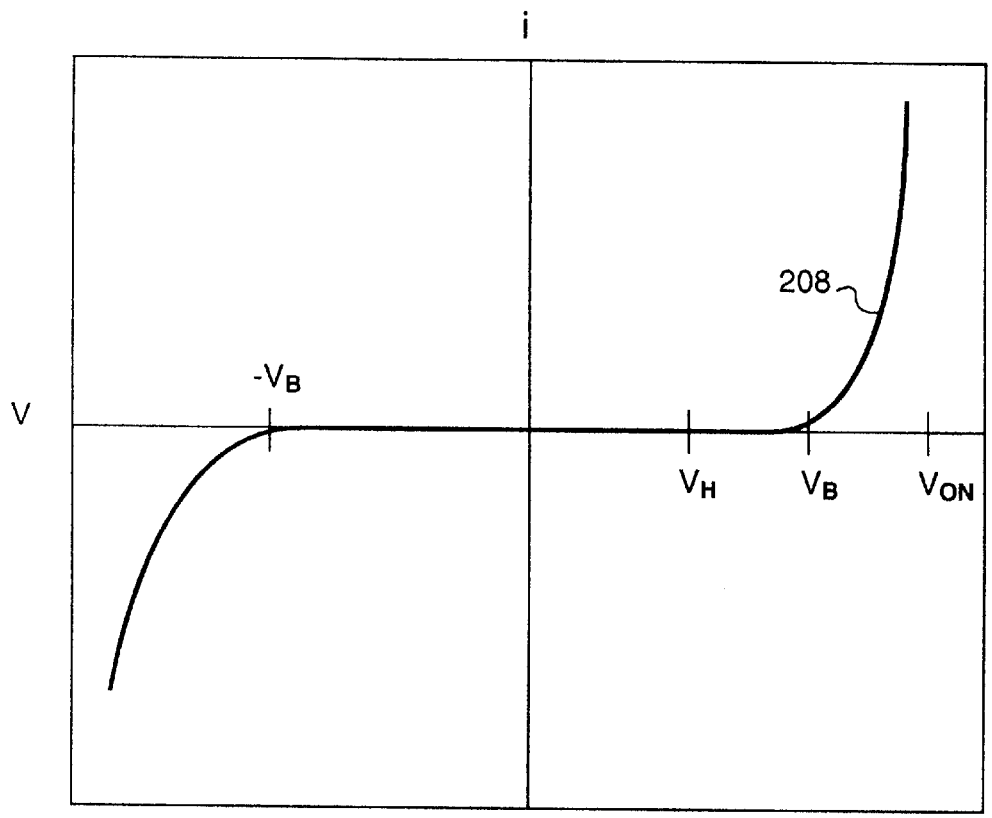
FIG. 2 is a graph of the current/voltage characteristic of a printable nonlinear element in accordance with the invention.

A preferred current/voltage characteristic of the nonlinear element 106 is depicted at 200 in FIG. 2. The characteristic is preferably symmetric as shown, with high impedance between some breakdown voltages $-V_b$ and $V_b$. For voltages greater in magnitude than $V_b$, the device exhibits a lower impedance, allowing exponentially more current to flow as the magnitude of the voltage across the device increases. The device whose response is depicted in FIG. 2 is essentially equivalent to two back-to-back Zener diodes. (Two diodes are necessary to ensure that the device is symmetric.) However, the response profile 200 can be obtained using devices other than back-to-back Zener diodes. The voltage $V_b$ is equal to the forward voltage drop $V_f$ of one diode plus the reverse breakdown voltage $V_{br}$ of the second diode. $V_{br}$ is usually larger in magnitude than $V_f$ and thus accounts for most of the breakdown voltage. Above $V_b$, current flow is exponentially proportional to the applied voltage.

This is similar to a varistor. A varistor has an inherently symmetrical I-V curve, given by the relation $I_v=(V/K)^\alpha$ where V is the applied voltage, K is a constant and $\alpha$ is determined by device structure. Thus, the varistor also offers an exponential rise in current for voltages above some breakdown voltage, and while the actual IV curves of back-to-back diodes and varistors may be slightly different, they have the same general properties and are both suitable for use as nonlinear elements in the display system of the present invention.

Figure 3A:
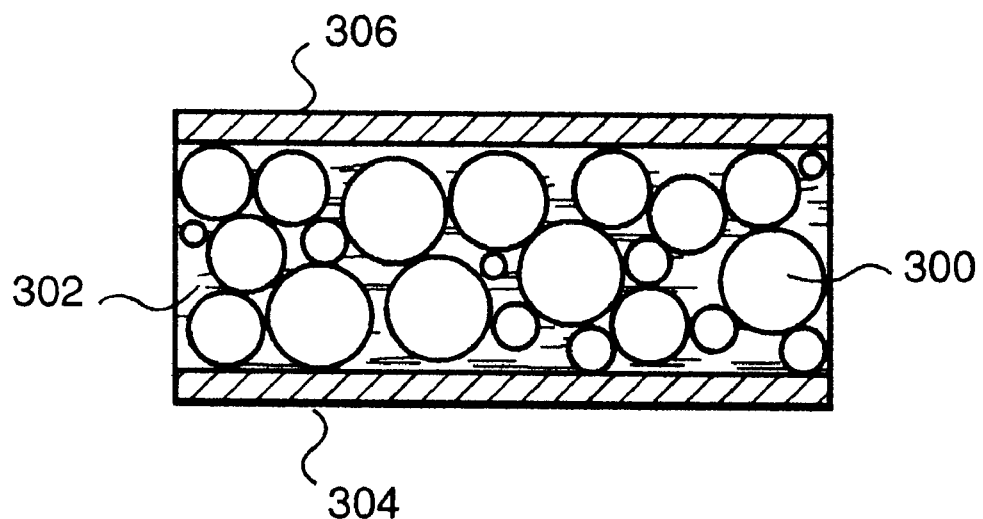
FIG. 3A is an enlarged sectional view of a varistor device in accordance with the invention.
Figure 3B:
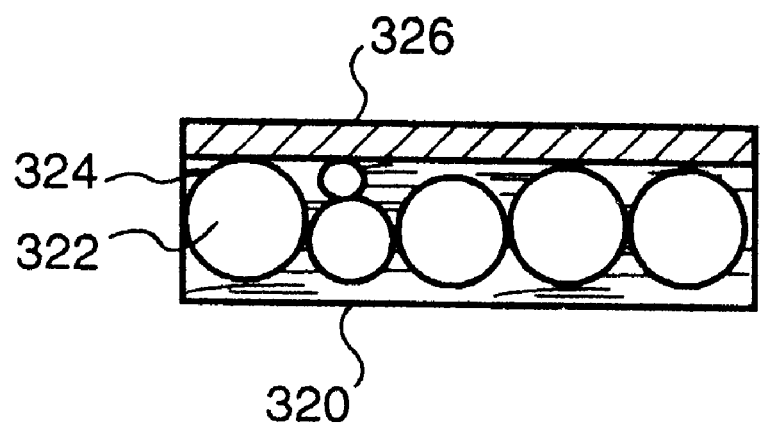
FIG. 3B is an enlarged sectional view of a semiconductor Schottky diode in accordance with the invention.
Figure 3C:
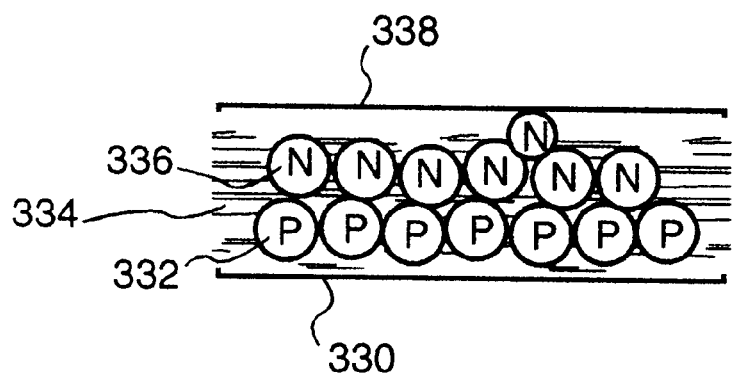
FIG. 3C is an enlarged sectional view of a particulate semiconductor diode in accordance with the invention.

Methods for creating nonlinear elements 106 vary depending upon the desired implementation. FIGS. 3A–3C show cross-sections of three different nonlinear elements suitable for use herewith: a particulate varistor device, a particulate Schottky diode, and a particulate PN diode.

The varistor of FIG. 3A can be prepared in the following manner (in rough accordance with the Yoshimoto patents). ZnO particles are first pressed under high pressure (greater than 100 kg/cm). After pressing, the resulting ZnO pellets are sintered at a temperature between 800° C. and 1400° C. After the initial sintering the ZnO is pulverized and sintered again. In order to fabricate a good varistor, the resulting particles are doped with one or more compounds selected from the group consisting of $Sb_2O_3$, MnO, $MnO_2$, $Co_2O_3$, CoO, $Bi_2O_3$, and $Cr_2O_3$. The amount of these dopants is up to 15% by weight of the ZnO particles. This mixture is then sintered again at temperatures greater than 800° C. The final particles are depicted at 300 in FIG. 3A.

The particles 300 are mixed with a suitable binder for screen printing. Binders based on either ethyl cellulose or polyvinyl alcohol with suitable solvents, as are well known to those of skill in the art, may be used. For ethyl cellulose-based binders, butyl carbitol acetate is the preferred solvent. The binder is typically almost completely burned off after curing, but is represented schematically (pre-cure) at 302.

In addition to the aforementioned binder it is desirable to add a glass frit to the mixture to provide for adhesion of the varistor paste to the substrate onto which it is to be printed. Typically, a glass frit having a low-temperature (e.g., ~400° C.) melting point is used. An alternative to the binder/glass-frit mixture is to disperse the varistor particles in a photo-hardening resin or epoxy. This provides adhesion the particles at a lower temperature than is required by the glass frit, and is cured through exposure to actinic radiation.

The exact composition of-the mixture may vary. In a typical application, the composition may consist of 70% varistor material, 20% glass frit and 10% binder. Different ratios may be used, for example, depending on whether the binder is ethyl cellulose-based, polyvinyl alcohol-based, resin-based, or epoxy-based.

This slurry or paste formed by dispersion of the particles in the binder is then deposited by means of standard printing techniques onto the bottom electrode 304. The deposited mixture is cured at temperatures up to 400° C. and/or exposed to actinic radiation, depending on the nature of the binder. Binders including a glass frit typically require curing temperatures of 400° C. and higher, while the systems not including glass may be cured at lower temperatures (e.g., less than 200° C.). After curing of the varistor, a top electrode 306 is printed, thus completing the device.

The Schottky diode structure shown in FIG. 3B is prepared in the following manner, in rough accordance with the '219 patent. Silicon particles derived from either amorphous or single-crystal silicon are first obtained. In an exemplary embodiment, P-type (boron-doped) silicon is employed. A suitable material is chosen for the rear electrode such that an ohmic contact can be formed with the semiconductor. Aluminum is especially suitable, although other metals with appropriate electron work functions may be used instead.

A rear or bottom electrode 320 is first printed and cured. The silicon particles 322 are mixed in a suitable binder 324 to produce a paste having desired properties for the particular application. For example, ethyl cellulose with butyl carbitol actetate as a solvent can serve as a suitable binder. For adhesion purposes, a glass frit may be mixed in with the binder and the silicon particles. The mixture is first printed (e.g., screened) onto the rear electrode. It is desirable to limit the thickness of this printed layer so that it is comparable to the diameter of the silicon particles. This produces a monolayer of particles, which ensures good current flow between the electrodes.

The applied mixture is then exposed to a multiphase temperature cycle. Initially a low temperature of 200° C. is used to burn off the organic binder. The sample is then raised to a temperature of approximately 660° C. This temperature, which is the eutectic point of silicon and aluminum, allows the silicon particles to form a good ohmic contact to the electrode. (Of course, the temperature may be altered if a material other than aluminum is used for rear electrode 320.) At this temperature the glass fit also becomes molten, helping to adhere the silicon to electrode 320 as well as providing an insulating layer so that the top electrode 326 does not short to bottom electrode 320. The temperature is then slowly lowered, allowing the silicon to recrystallize. After the sample has been cooled, top electrode 326 is printed on the device. Silver inks provide rectifying contacts to P-type materials and are preferred for electrode 326 in the context of this example. Different materials may be utilized if desired, or if N-type particles are used. After the electrode 326 is printed, the sample is fired to cure the ink and complete the device.

The device depicted in FIG. 3B forms only one half of the necessary back-to-back structure. A second device is therefore created and attached in the appropriate configuration to the first device to produce a symmetric nonlinear element.

The PN diode structure shown in FIG. 3C may be prepared as follows. Silicon particles derived from either amorphous or single-crystal silicon are first obtained. In a representative example, P-type and N-type silicon are used. A suitable material is chosen for both the rear and front electrodes such that ohmic contacts can be formed with the two types of semiconductor. The bottom electrode 330 is first printed and cured. The P-type silicon particles 332 are once again mixed in a suitable binder 334. Once again, a variety of pastes may be obtained, depending on the binder chosen. Ethyl cellulose with butyl carbitol acetate as the solvent can serve as a suitable binder. For adhesion purposes, a glass frit may be mixed in with the binder and silicon. The mixture is printed (e.g., by screening) onto electrode 330, which serves as the rear electrode.

The N-type particles 336 are also dispersed in a binder. After the P-type particles are exposed to a 200° C. temperature cycyle to burn off their binder, the N-type particles are printed (again, for example, by screening) on top of the layer of P-type particles 332. Once again, a 200° C. temperature cycle is used to burn off the binder. A top electrode 338 is then printed on the N particles.

This construction is then exposed to a multiphase temperature cycle. Initially a low temperature of 200° C. is used to eliminate any remaining organic binder. The sample is then raised to a higher temperature, which is chosen to alloy the silicon particles to their respective contacts. At this temperature the glass frit also becomes molten, helping to adhere the silicon to the contact as well as providing an insulating layer so that the elctrodes do not short to each other. The temperature is then slowly lowered, allowing the silicon to recrystallize and thereby form the PN diode structure.

Once again, this device only forms one half of the necessary back-to-back structure. A second device is therefore created and attached in the appropriate configuration to the first device to produce a symmetric nonlinear element.

It is also possible to utilize for creating printable nonlinear elements that do not involve particulate systems. For example, the printable nonlinear element may be a silicon film formed by chemically reducing a molecularly dissolved silicide salt, as described in the '469 PCT application and in Anderson et al., "Solution Grown Polysilicon for Flat Panel Displays," *Mat. Res. Soc. Meet.*, Spring 1996 (paper H8.1) (incorporated by reference herein); or may instead be a printable polymer conductor, as described in the '469 PCT application and in Torsi et al., "Organic Thin-Film Trasnsistors with High On/Off Ratios," *Mat. Res. Soc. Symp. Proc.* 377:695 (1995) (incorporated by reference herein).

The electrooptic display element of the present invention is preferably an electrophoretic display in accordance with the '260 application, and is based on an arrangement of microscopic containers or microcapsules, each microcapsule having therein an electrophoretic composition of a dielectric fluid and a suspension of particles that visually contrast with the dielectric liquid and also exhibit surface charges. Electrodes disposed on and covering opposite sides of the microcapsule arrangement, provide means for creating a potential difference that causes the particles to migrate toward one of the electrodes.

As discussed in the '260 application, the display microcapsules preferably have dimensions ranging from 5 to 500 $\mu$m, and ideally from 25 to 250 $\mu$m. The walls of the microcapsules preferably exhibit a resistivity similar to that of the dielectric liquid therein. It may also be useful to match the refractive index of the microcapsules with that of the electrophoretic composition. Ordinarily, the dielectric liquid is hydrophobic, and techniques for encapsulating a hydrophobic internal phase are well characterized in the art. The process selected may impose limitations on the identity and properties of the dielectric liquid; for example, certain condensation processes may require dielectric liquids with relatively high boiling points and low vapor pressures.

Figure 4A:
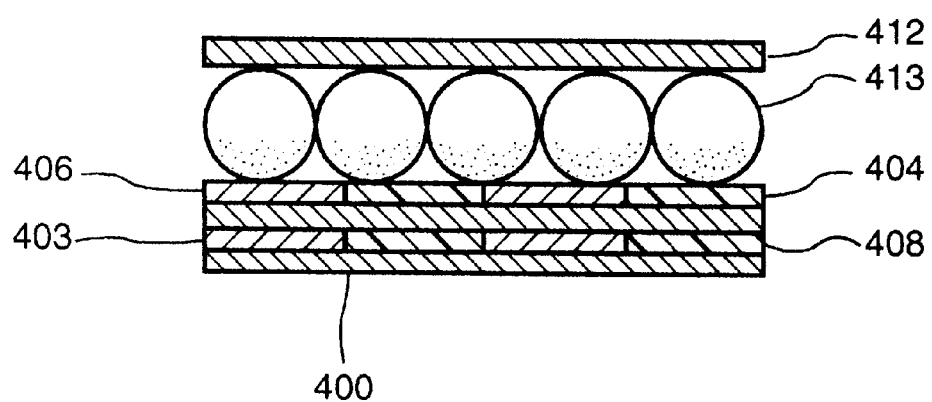
FIGS. 4A and 4C are enlarged sectional views of display systems in accordance with the invention each including row and column electrodes, a microencapsulated electrophoretic display material, an insulator material, and a nonlinear backplane.
Figure 4B:
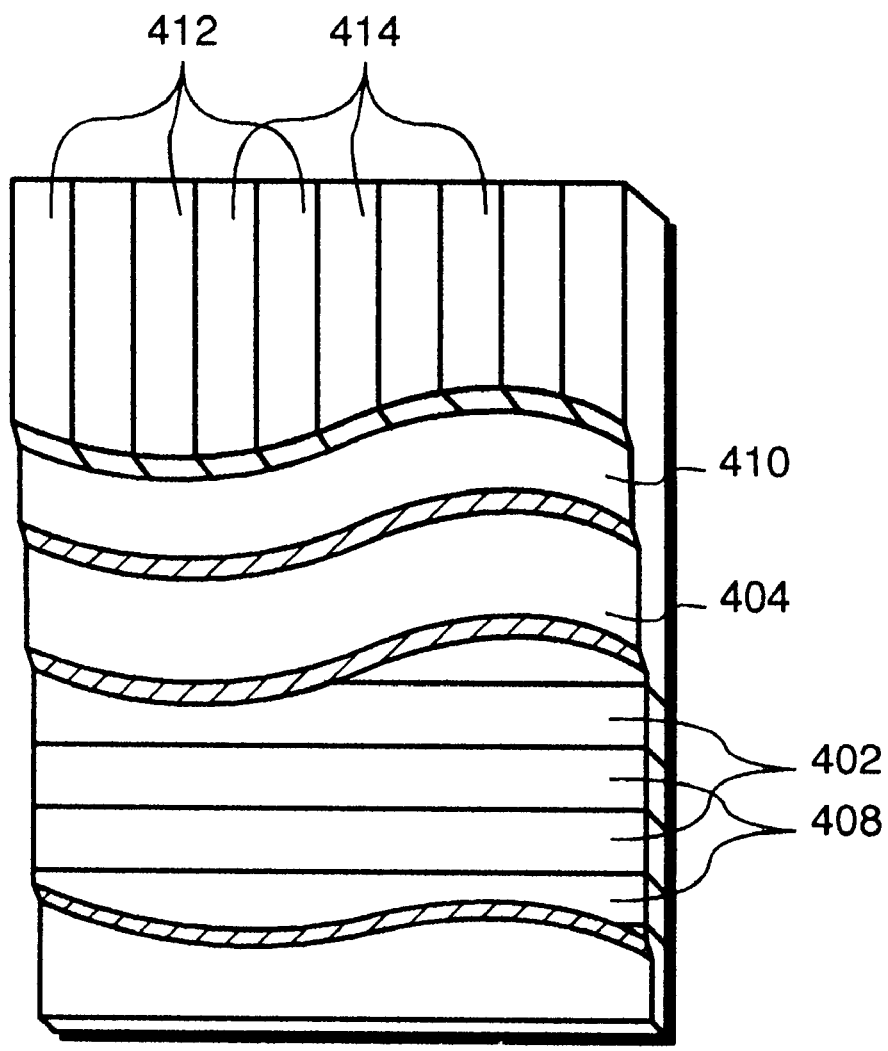
FIGS. 4B and 4D are partially cutaway plan views of the display systems shown in FIGS. 4A and 4C, respectively.

FIGS. 4A and 4B illustrate a complete printed display system with a continuous nonlinear-element backplane. The device includes a substrate 400, which is typically a thin, flexible material such as KAPTON film. The row electrodes 402 have preferably been deposited on substrate 400 by means of a printing process. In the illustrated embodiment, the nonlinear backplane 404 is a continuous layer of either particulate varistor material or particulate diode material. The structure represented at 404 may also be a layer of particulate silicon, a printed metal-contact and then another layer of particulate silicon. Alternatively, the structure 404 may comprise layers of P- and N-doped particulate semiconductor inks, printed in an ascending pattern such as PNPNPNNPNPNP. An arbitrarily large number of layers may be printed, the optimal number depending primarily upon the desired breakdown voltage.

An optional second set of printed row electrodes 406 (shown only in FIG. 4A), aligned with the first set 402, provide a contact to the other side of the nonlinear material 404. An insulator material, such as Acheson ML25208, is print-deposited in the lanes 408 defining the space between electrodes 402, so that a smooth surface is formed. An electrooptic display 410, such as a layer of electrophoretic display microcapsules, is print-deposited onto electrodes 406 or, if these are omitted, onto nonlinear backplane 404. A set of transparent column electrodes 412 is print-deposited onto display 410 in a pattern orthogonal to row electrodes 402 (and, if included, 406). An insulator material is print-deposited in lanes 414 between electrodes 412. Active picture elements are defined in the regions of display 410 where these orthogonal sets of electrodes overlap. Thus, a display with M row electrodes and N column electrodes has M×N picture elements.

Figure 4C:
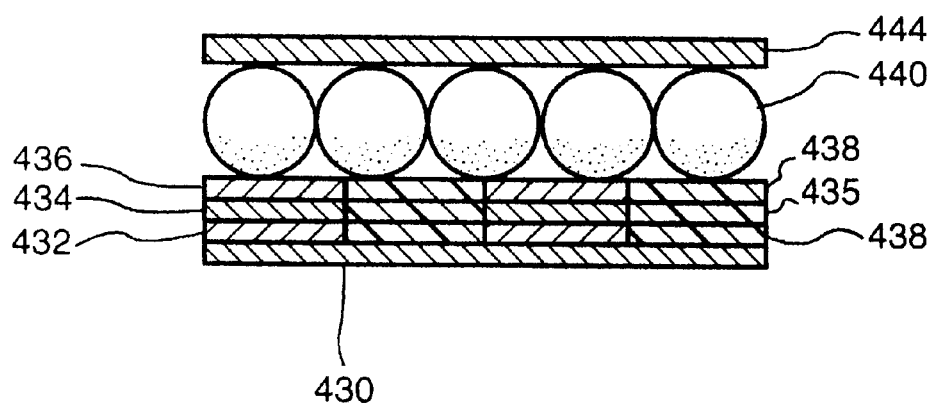
Figure 4D:
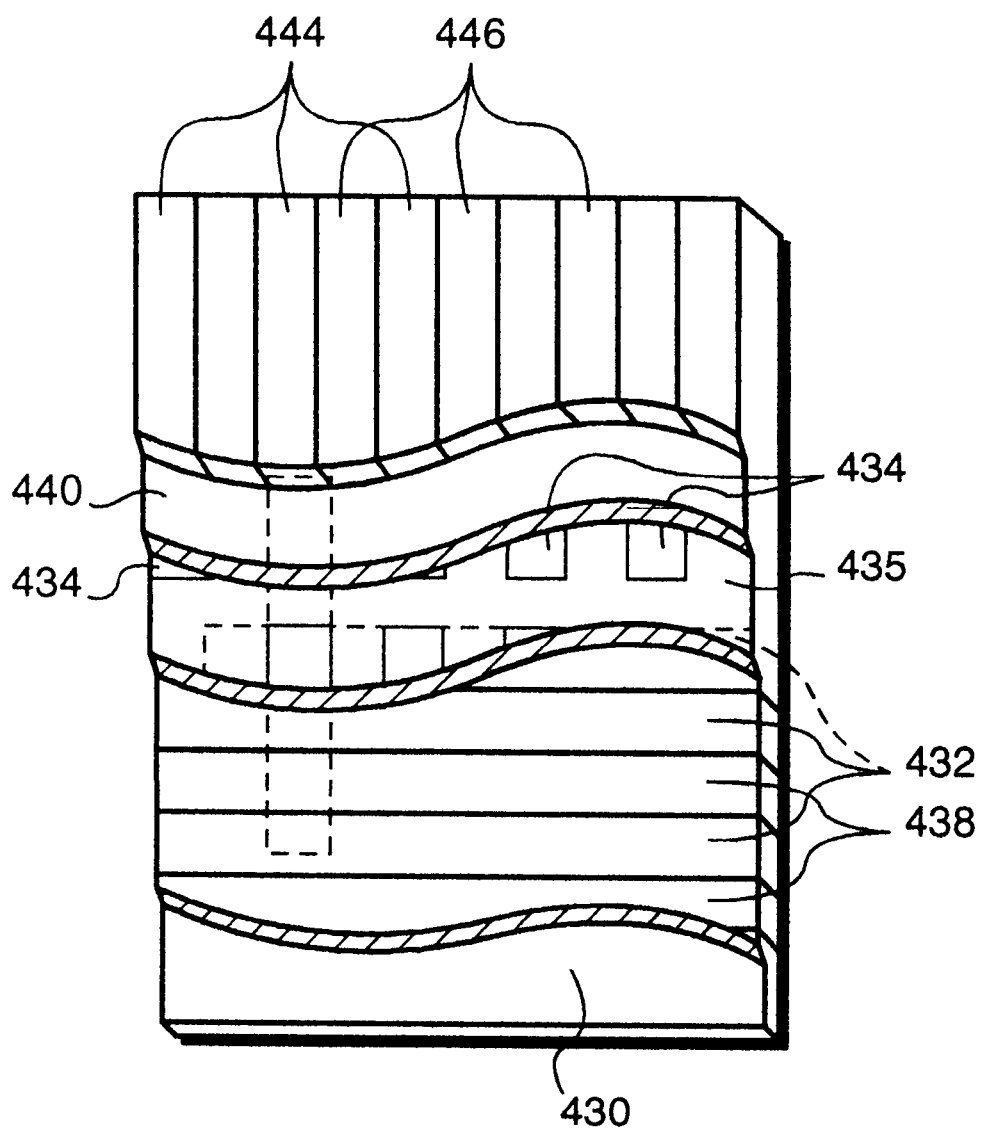

The material of nonlinear backplane 404 can be continuous or deposited as a discrete array, e.g., in a matrix pattern with nonlinear material printed only in the areas of active picture elements (i.e., where row and column electrodes overlap). Such an arrangement is depicted in FIGS. 4C and 4D. A substrate 430, typically composed of a thin, flexible material such as KAPTON film, underlies a set of row electrodes 432 which preferably have been deposited on the substrate by means of a printing process. The nonlinear backplane 434, which may comprise printed back-to-back diodes or printed varistor material, is deposited in a pattern corresponding to the active picture elements—that is, where the row and column electrodes cross. An insulator material 435 is deposited so as to surround elements 434 and thereby create a uniform planar surface. Once again, the structure represented at 434 may also be a layer of particulate silicon, a printed metal contact and then another layer of particulate silicon. Alternatively, the structure 434 may comprise layers of P- and N-doped particulate semiconductor inks, printed in an ascending pattern such as PNPNPNNPNPNP. An arbitrarily large number of layers may be printed, the optimal number depending primarily upon the desired breakdown voltage.

An optional second set of printed row electrodes 436, aligned with the first set 432, provide a contact to the other side of the nonlinear material 434. An insulator material, such as Acheson ML25208, is print-deposited in the lanes 438 defining the space between electrodes 432. An electrooptic display 440 is print-deposited onto electrodes 436 or, if these are omitted, onto nonlinear backplane 434. A set of transparent column electrodes 444 is print-deposited onto display 440 in a pattern orthogonal to row electrodes 432 (and, if included, 436). Active picture elements are defined in the regions of display 440 where these orthogonal sets of electrodes overlap. An insulator material is print-deposited in lanes 4446 between electrodes 444.

Figure 5:
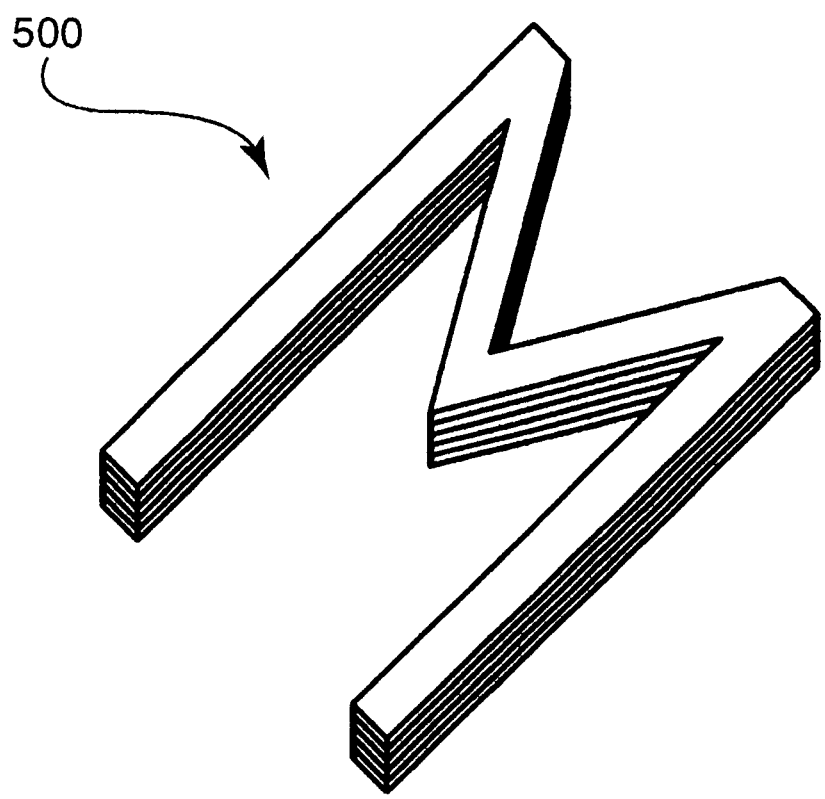
FIG. 5 is an isometric view of a display device in accordance with the invention, and which has been fabricated into the form of the letter M.

FIG. 5 depicts a screen-printed display 500 in the form of the letter 'M'. The display 500 is a layered structure, the layers corresponding to those shown sectionally in FIGS. 4A and 4B. The result is a nonemissive, screen-printed, microencapsulated electrophoretic display, printed on an arbitrary substrate in an arbitrary shape.

Figure 6A:
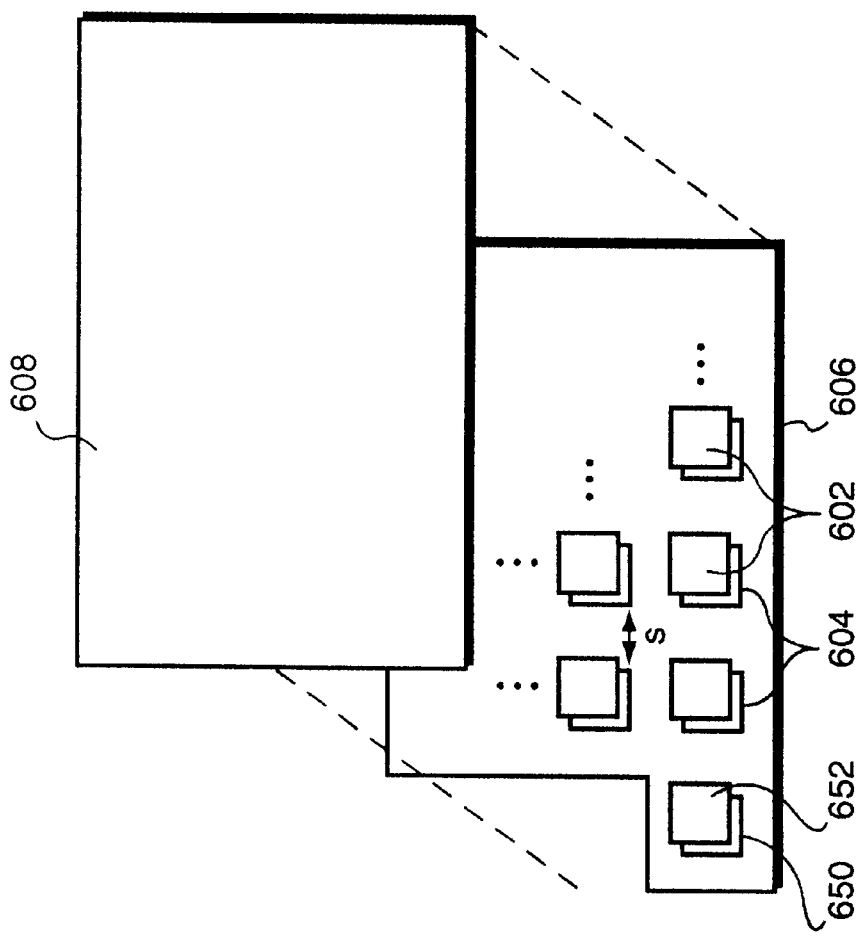
FIG. 6A is a partially exploded, schematic illustration of an address configuration with one electrode floating.
Figure 6B:
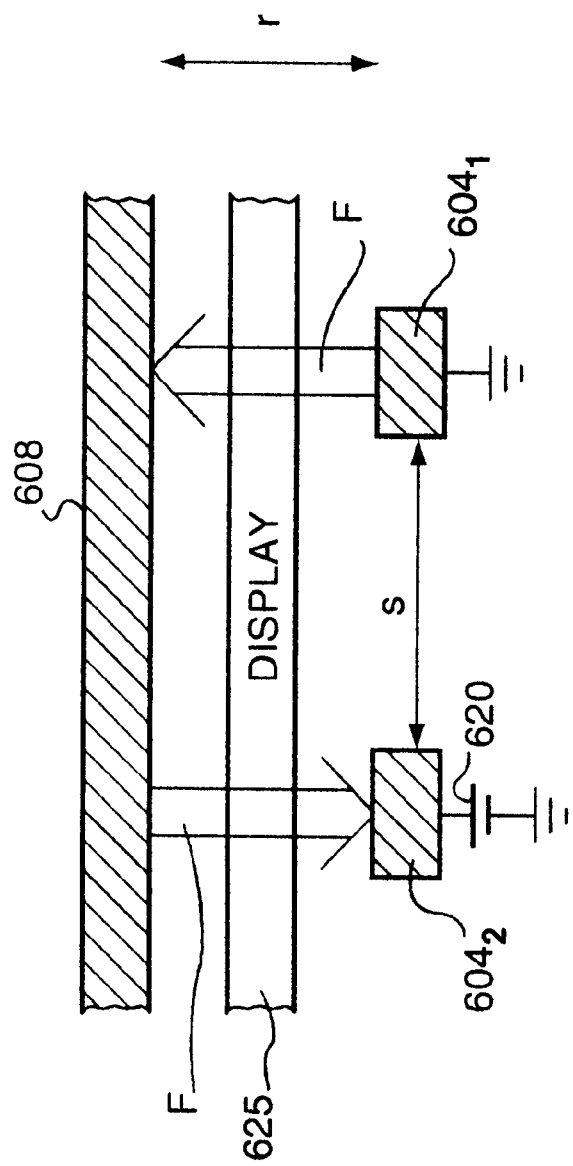
FIG. 6B is an elevation of an alternative embodiment of the floating-electrode address configuration shown in FIG. 6A.

FIGS. 6A and 6B show a scheme for addressing a display where the top electrode is "floating," i.e., not electrically connected. This greatly simplifies the layout, although at the cost of increasing the required supply voltage; the depicted arrangement also envisions pixelwise addressing. With reference to FIG. 6A, a series of display elements 602 each overlie an associated electrode 604, all of which are carried as a pixel array on a substrate 606. A single floating plate electrode 608 overlies the displays 602. Alternatively, as shown in FIG. 6B, the display may be a continuous element substantially coextensive with substrate 606; discrete regions of such a display, which lie above and are separately addressed by each of the electrodes 604, act as individual pixels.

Electrodes 604 are spaced apart from one another by a distance s, and with the components in place, are separated from electrode 608 by a distance r. So long as r <<s, placing two adjacent electrodes 604 at $V_1$ and $V_2$ induces a potential of $(V_1+V_2)/2$ at electrode 608; accordingly, as a result of the arrangement, the field across display medium 602 will be half that which would be achieved were $V_1$ and $V_2$ applied directly. More specifically, suppose, as shown in FIG. 6B, that a first electrode $604_1$ is grounded and a second electrode $604_2$ connected to a battery 620 of voltage V. In this case the induced voltage in electrode 608 is V/2, but the electric field F traverses the display 605 in opposite directions above electrodes $604_1$, $604_2$. As a result, assuming that the voltage V/2 is sufficient to cause switching of display 625 within an acceptable switching time, the regions of display 625 above the two electrodes will be driven into opposite states.

This arrangement cannot sustain a condition where every display element (or region) is in the same state. To provide for this possibility, a separate electrode 650 (and, if the display is organized discretely, a corresponding display element 652) are located outside the visual area of the display—that is, the area of the display visible to the viewer. In this way, electrode 650 may be biased oppositely with respect to all other pixels in the device without visual effect.

Figure 7A:
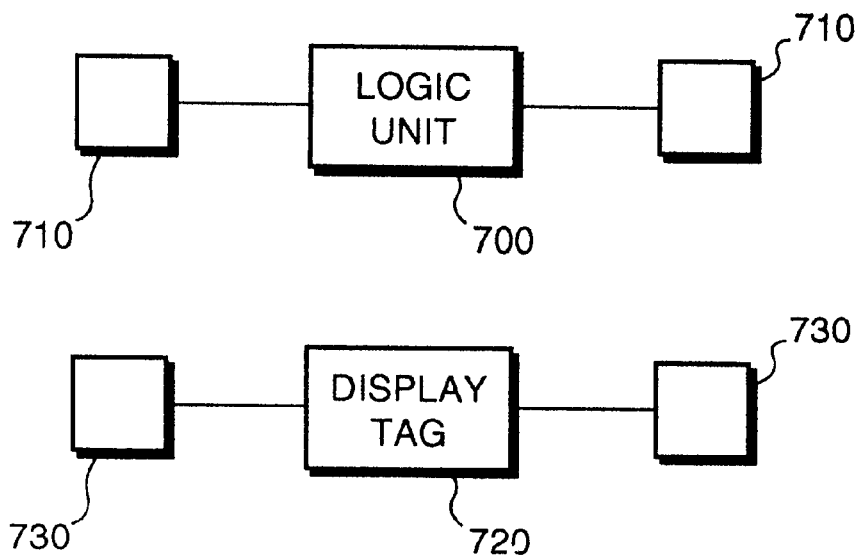
FIGS. 7A and 7B schematically illustrate remotely powered displays.
Figure 7B:
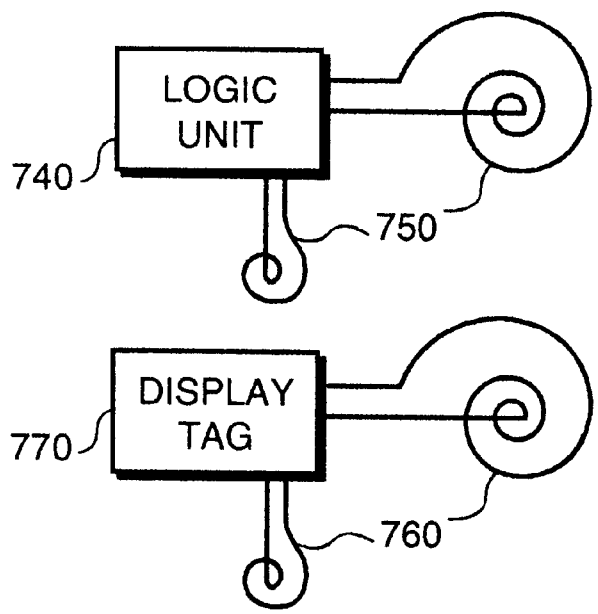

Refer now to FIGS. 7A and 7B, which illustrate remote powering of displays. With particular reference to FIG. 7A, a capacitive arrangement comprises a logic/control unit 700 and a pair of transmitting electrodes 710 connected thereto. A display unit or "tag" 720, which may have a nonlinear backplane, is connected to a complementary pair of receiving electrodes 730. Upon application of an AC signal to transmitting electrodes 710, an AC field is induced in receiving electrodes 720 as they physically approach the transmitting electrodes. The current produced by this field can be used to directly power display unit 720 (e.g., after being passed through a rectifier), or it can instead be filtered or otherwise processed by on-board logic in display 720. For example, the AC signal can convey information to such display logic to determine the appearance of the display. For example, one or more notch filters can be employed so that upon detection of a first AC frequency, the display 720 is placed into a certain state, and upon detection of a second AC frequency, is changed into a different state. With the addition of nonlinear elements, more sophistical signal processing can be effected while retaining the simple circuit design of FIG. 7A. All electronic elements associated with logic unit 700 and display unit 720 may be generated by a printing process.

FIG. 7B shows an inductive approach to remote powering and signalling. The illustrated inductive arrangement includes a logic/control unit 740 and one or more transmitting coils 750. A display unit or tag 770, which may have a nonlinear backplane, is connected to a complementary pair of receiving coils 760. Upon application of an AC signal to transmitting coils 750, the resulting magnetic field induces an AC current in receiving coils 760. The induced current can be used to directly power display unit 770 or convey information in the manner described above. Once again, the arrangment may include notch filters or additional nonlinear elements for more sophistical signal processing. All electronic elements associated with logic unit 740 and display unit 770 may be generated by a printing process.

Figure 8A:
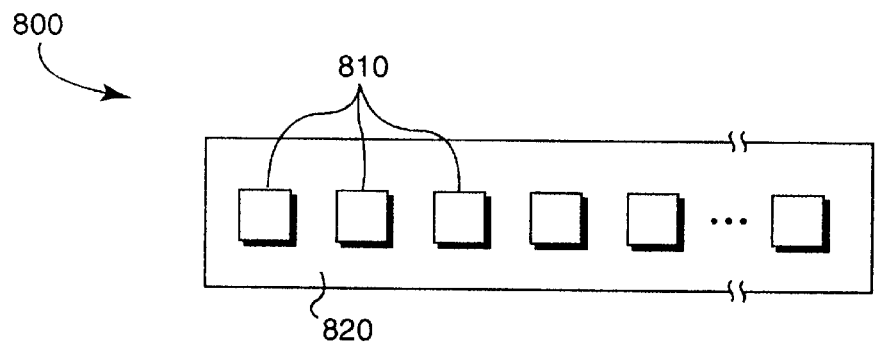
FIGS. 8A and 8B illustrate application of the invention to produce a graduated scale.
Figure 8B:
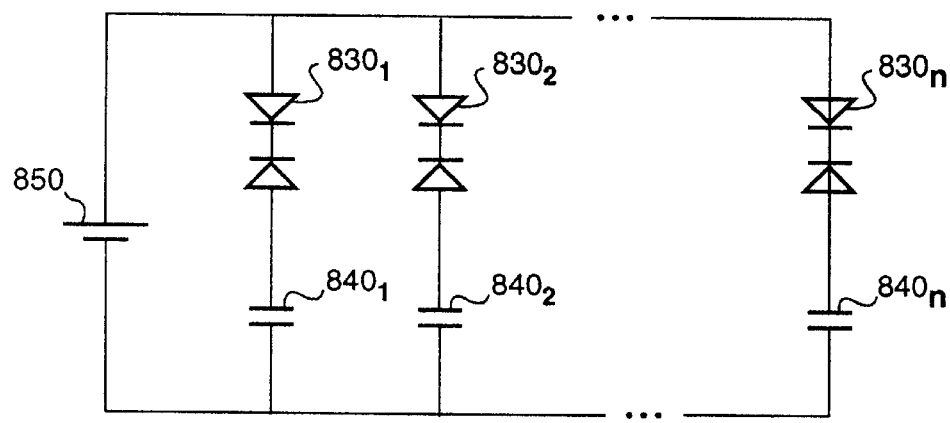

Refer now to FIGS. 8A and 8B, which illustrate application of the invention to create a voltage scale (which may serve, for example, as a battery indicator). The display system 800 includes a series of individual particle-based (preferably electrophoretic) display devices 810 mounted on a substrate 820. Each display device 810 includes a rear electrode, a nonlinear device, a display element (which may be discrete or shared among all devices 810), and a transparent electrode; these components are preferably printed in a stack structure in the manner illustrated in FIG. 6A.

As shown in FIG. 8B, each display can be represented as a nonlinear device $830_1 \ldots 830_n$ and a capacitor $840_n \ldots 840_n$. The nonlinear devices 830 have progressively higher breakdown voltages. Accordingly, the number of such displays "turned on" (or "turned off") at any time reflects the voltage (e.g., from a battery 850) across the displays. In operation, all of the displays 810 are initially in the same state. Each of the displays 810 changes state only when the potential exceeds the breakdown voltage of the associated nonlinear device. To reset the device, the user activates a switch (not shown) which reverses the connection of battery 850 and causes it to generate a potential exceeding the breakdown voltages of all nonlinear devices 830.

It will therefore be seen that the foregoing represents a versatile and convenient approach to the design and manufacture of particle-based display systems. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A method of fabricating an electronic display, the method comprising the steps of:

a. print-depositing a first set of electrodes onto a substrate;

b. print-depositing a plurality of nonlinear elements above at least some of the electrodes, the nonlinear elements having a voltage threshold;

c. print-depositing a particle-based nonemissive display material over the nonlinear elements; and d. print-depositing a second set of electrodes over the display material and in an intersecting pattern with respect to the first set of electrodes, thereby sandwiching the display and the nonlinear elements between electrodes at regions of intersection, the sandwiched display material and the nonlinear elements electrically coupling at least some electrodes of the first set with corresponding electrodes of the second set at regions of intersection such that a voltage exceeding the threshold and applied across the electrodes will cause current to flow between the electrodes, thereby activating the display.

2. The method of claim 1 wherein the nonemissive display is an electrophoretic display.

3. The method of claim 1 wherein the nonemissive display is a rotating-ball display.

4. The method of claim 1 wherein the nonemissive display is an electrostatic display.

5. The method of claim 2 wherein the electrophoretic display comprises:

a. an arrangement of discrete microscopic containers, each container being no longer than 500 $\mu$m along any dimension thereof; and b. within each container, a dielectric fluid and a suspension therein of particles exhibiting surface charges, the fluid and the particles contrasting visually, the particles migrating toward one of the sets of electrodes in response to a potential difference therebetween.

* * * * *